(12) United States Patent
McDonald et al.

(10) Patent No.: US 11,108,834 B2
(45) Date of Patent: Aug. 31, 2021

(54) METHOD AND SYSTEM FOR COMPLETING A VOICE CALL IN A CLOUD-BASED COMMUNICATION SYSTEM

(71) Applicant: MOTOROLA SOLUTIONS, INC., Chicago, IL (US)

(72) Inventors: Daniel J. McDonald, Cary, IL (US); Svend Frandsen, Koege (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 55 days.

(21) Appl. No.: 16/668,428

(22) Filed: Oct. 30, 2019

(65) Prior Publication Data

US 2021/0136131 A1 May 6, 2021

(51) Int. Cl.
*H04L 29/06* (2006.01)
*H04L 29/08* (2006.01)

(52) U.S. Cl.
CPC ...... *H04L 65/4053* (2013.01); *H04L 65/1069* (2013.01); *H04L 67/10* (2013.01)

(58) Field of Classification Search
None
See application file for complete search history.

(56) References Cited

U.S. PATENT DOCUMENTS

| | | |
|---|---|---|
| 5,689,810 A | 11/1997 | Shaughnessy et al. |
| 5,724,648 A | 3/1998 | Shaughnessy et al. |
| 8,571,549 B2 | 10/2013 | Peterson et al. |
| 8,886,182 B2 | 11/2014 | Peterson et al. |
| 9,042,929 B2 | 5/2015 | Kuehner |
| 2007/0133435 A1* | 6/2007 | Eneroth .................. H04W 4/10 370/260 |
| 2010/0248692 A1* | 9/2010 | Keller .................... H04W 4/029 455/412.1 |
| 2010/0260173 A1* | 10/2010 | Johnson ................ H04L 65/102 370/356 |
| 2012/0172083 A1* | 7/2012 | Logalbo ................ H04W 8/186 455/525 |

(Continued)

FOREIGN PATENT DOCUMENTS

| | | |
|---|---|---|
| WO | 2013066628 A1 | 5/2013 |
| WO | 2019199516 A1 | 10/2019 |

OTHER PUBLICATIONS

The International Search Report and the Written Opinion corresponding patent application No. PCT/US2020/056266 filed Oct. 19, 2020, dated Jan. 26, 2021, all pages.

*Primary Examiner* — Jamaal Henson

(57) ABSTRACT

A method and system for completing a voice call in a cloud-based communication system is provided. A cloud-based group voice call service receives a group voice call initiation request from a first mobile device located at a first communication system. The group voice call initiation request is a request to complete a group voice call with a second mobile device located at a second communication system. The cloud-based group voice call service allocates resources at the first communication system and the second communication system. The cloud-based group voice call service issues a call grant to the first mobile device located at the first communication system and also issues a call response to the second mobile device located at the second communication system in order to complete the voice call.

4 Claims, 3 Drawing Sheets

(56) References Cited

U.S. PATENT DOCUMENTS

| | | | |
|---|---|---|---|
| 2013/0279375 A1* | 10/2013 | Newberg | H04W 88/16 370/260 |
| 2014/0133482 A1* | 5/2014 | Lawson | H04M 15/34 370/352 |
| 2017/0237600 A1 | 8/2017 | Patel et al. | |
| 2020/0178345 A1* | 6/2020 | Trank | H04M 15/66 |
| 2021/0136131 A1* | 5/2021 | McDonald | H04L 65/4053 |

\* cited by examiner

METHOD AND SYSTEM FOR COMPLETING A VOICE CALL IN A CLOUD-BASED COMMUNICATION SYSTEM

BACKGROUND OF THE INVENTION

Communication systems, such as Land Mobile Radio (LMR) or Long-Term Evolution (LTE) cellular systems, are becoming more and more ubiquitous. Typically each of these communication systems includes a completely operational communication system. This requires significant financial outlays as well as substantial complexity when inter-system calls are placed.

In addition, updates to subscriber and talkgroup information needs to be coordinated across communication systems. Latency delays between communication systems can lead to problems connecting mobile devices and can also lead to missed calls or non-optimal use of resources.

Therefore a need exists for a method and system for completing voice calls between communication systems that resolve the problems of current communication systems.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
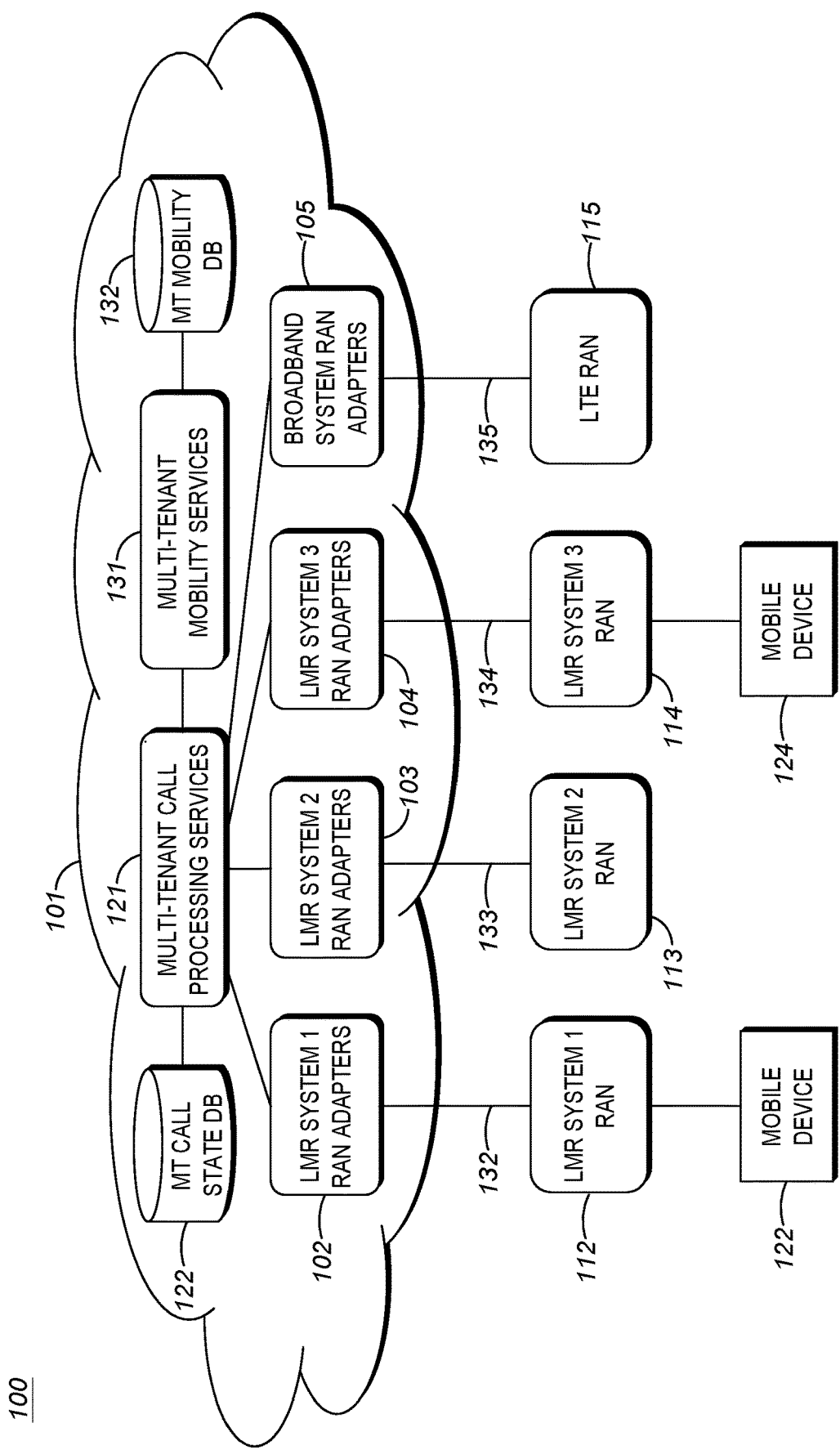
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 comprises Call Processing System 101, Land Mobile Radio (LMR) System RAN 112, LMR System RAN 113, LMR System RAN 114, and Long Term Evolution (LTE) System RAN 115. Although only four Radio Frequency (RF) systems (112-115) are shown in FIG. 1 for clarity, it should be understood that communication system 100 could include additional or fewer RF systems. In addition, the type of RF systems within communication system 100 can vary, and can include all RF systems of a single type or any combination of compatible RF systems. Depending on the standard, mobile phones and other wireless connected devices are varyingly known as user equipment (UE), terminal equipment, mobile stations (MS), mobile units, mobile devices, and by other similar names.

A RAN is part of a mobile telecommunication system that implements a radio access technology. In exemplary systems, a RAN resides between a device, such as a mobile phone, a computer, or any remotely controlled machine, and provides connection with a core network, such as Call Processing System 101.

Call Processing System 101 preferably includes LMR System 1 RAN Adapters 102, LMR System 2 RAN Adapters 103, LMR System 3 RAN Adapters 104, Broadband System RAN Adapters 105, Multi-Tenant Call Processing Services 121, Multi-Tenant Call State Database 122, Multi-Tenant Mobility Services 131, and Multi-Tenant Mobility Database 132. In this exemplary embodiment, LMR System 1 RA 102 is operably coupled with LMR System 1 RAN 112 via link 132, LMR System 2 RA 103 is operably coupled with \LMR System 2 RAN 113 via link 133, LMR System 3 RA 104 is operably coupled with LMR System 3 RAN 114 via link 134, and Broadband System RA 105 is operably coupled with LTE RAN 115 via link 135. In an alternate exemplary embodiment, LMR System 1 RA 102 resides in LMR System 1 RAN 112, LMR System 2 RA 103 resides in LMR System 2 RAN 113, LMR System 3 RA 104 resides in LMR System 3 RAN 114, and Broadband System RA 105 resides in LTE RAN 115.

In accordance with an exemplary embodiment, Call Processing System 101 provides cloud-based call processing for multi-system, multi-tenant, multi-technology calls. Call Processing System 101 also preferably provides a fallback solution should a RAN either not desire or not be able to complete calls using Call Processing System 101. In this scenario, a RAN, such as LMR System 1 RAN 112, includes call processing and resource management functionality so that calls can be processed in standalone, fallback mode. The fallback solution provides a flexible system that can result in a single system, single tenant voice call processing service. In this exemplary embodiment, the fallback solution preferably provides a solution that results in a single system, single tenant access permission database and a single tenant mobility management database that are kept up to date in real time from the multi-system, multi-tenant database, Multi-Tenant Mobility Database 132.

Call Processing System 101 includes a RAN Adaptation Layer, which is preferably comprised of a plurality of RAN Adapters, such as LMR System RAN Adapters 102, LMR System RAN Adapters 103, LMR System RAN Adapters 104, and Broadband System RAN Adapters 105. The RAN Adapters enable a common call processing solution yet still support different technologies, including LMR and Broadband technologies. In an exemplary embodiment, the RAN Adaptation Layer comprises one RAN Adapter per edge component (for example a RAN Adapter per RF or Console site), termination of the layer 2 message delivery protocol (for example a Transport Layer Security (TLS) link to the sites), conversion of technology specific messages to generic services messages, allocation of RAN specific resources (for example allocating RF channels for LMR sites or console bandwidth for console sites done on a per-RAN Adapter level), and RAN component functionality that is considered unique to the specific service rules associated with a RAN (for example resending call grants to an LMR site when a communication device registers at a site).

In accordance with FIG. 1, LMR System RAN Adapters 102 is coupled to LMR

System RAN 112, LMR System RAN Adapters 103 is coupled to LMR System RAN 113, LMR System RAN Adapters 104 is coupled to LMR System RAN 114, and Broadband System RAN Adapters 105 is coupled to LTE System RAN 115.

Figure 2:
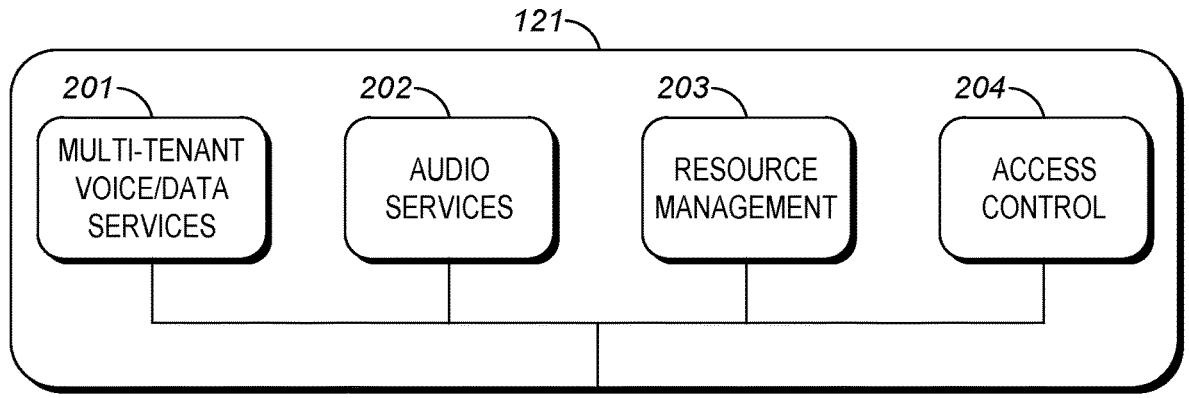
FIG. 2 depicts a multi-tenant call processing services function in accordance with an exemplary embodiment of the present invention.

Multi-Tenant Call Processing Services 121 provides multi-tenant, multi-system, and multi-technology voice call processing service and is depicted in more detail in FIG. 2. In accordance with an exemplary embodiment, Multi-Tenant Call Processing Services 121 is a cloud-based solution that supports multi-tenant voice call processing services and controls at least one access permission database and accesses at least one mobility database, such as Multi-Tenant Mobility Database 132. Multi-Tenant Call Processing Services 121 preferably controls and maintains Multi-Tenant Call State Database 122, for example by writing and reading call information from and to Multi-Tenant Call State Database 122.

Multi-Tenant Call State Database 122 stores the current active call state for every call being processed by Call Processing System 101. the state of the call for active calls, the current audio source of the call, and the priority of the current audio source of the call. The state of the call can be, for example, active voice, hangtime, or call teardown. The current audio source of the call can be, for example, a radio or a console.

Multi-Tenant Mobility Services 131 supports the services necessary to enable radio or console access to the system. In an exemplary embodiment, Multi-Tenant Mobility Services 131 includes the functions of authentication, radio registration, radio affiliation, radio deregistration, console in service, console affiliation, console association, and console out of service. Since the mobility services update and maintain the mobility data associated with these services, access to information in Multi-Tenant Mobility Database 132 preferably flows through Multi-Tenant Mobility Services 131. Therefore, user services, such as group call, preferably access the mobility information via mobility services microservices.

Multi-Tenant Mobility Database 132 preferably stores mobility information for mobile stations and console terminals. In accordance with an exemplary embodiment, Multi-Tenant Mobility Database 132 stores the mobile station (MS) registration state, the MS talkgroup affiliation, the MS site location, the console registration state, and console affiliated talkgroup information. Multi-Tenant Mobility Database 132 can be, for example, an integrated Home Location Register (iHLR), a Gateway HLR (GHLR), a Visitor Location Register (VLR), or a combination of one or more of the above.

In the exemplary embodiment depicted in FIG. 1, LMR System RAN 112 is an ASTRO digital two-way radio communications network that is designed specifically for law enforcement, fire and medical services to communicate with each other during emergency situations. LMR System RAN 112 is a mission critical voice and data communication network and can operate in the 700 MHz, 800 MHz, 900 MHz, UHF and VHF bands for voice and data operation.

In an exemplary embodiment, each of the RANs 112-115 include multiple sites, each site equipped with a plurality of base stations. Each RAN 112-115 also preferably includes software and hardware to allow for fallback operation, which occurs when a RAN desires to operate apart from Call Processing System 101.

In the exemplary embodiment depicted in FIG. 1, LMR System RAN 113 is also an ASTRO digital two-way radio communications network. In this exemplary embodiment, LMR System RAN 113 has a different Wide Area Communications Network (WACN)/System ID information than LMR System RAN 112.

In the exemplary embodiment depicted in FIG. 1, LMR System RAN 114 is a MotoTRBO LMR system that preferably operates in multi-system, cloud-based mode. When the connection between LMR System RAN 114 and Multi-Tenant Call Processing Services 121 goes down, LMR System RAN 114 can fall back to single site operation. This same functionality of falling back to single site operation preferably exists for all RANs in FIG. 1, for example (LMR System RAN 112, LMR System RAN 113, and LTE System RAN 115.

In an exemplary embodiment depicted in FIG. 1, LTE System RAN 115 is an LTE RAN that provides broadband access and services to subscribers.

FIG. 2 depicts multi-tenant call processing services function 121 in additional detail in accordance with an exemplary embodiment of the present invention.

Multi-Tenant Call Processing Services 121 comprises Multi-Tenant Voice/Data Services Processor 201, Audio Services Processor 202, Resource Management Processor 203, and Access Control Processor 204.

Multi-Tenant Voice/Data Services Processor 201 performs the processing of voice calls and data services for mobile devices utilizing Multi-Tenant Call Processing Services 121. In accordance with an exemplary embodiment, the mobile devices utilizing Multi-Tenant Voice/Data Services Processor 201 can be of any technology that is connected to Multi-Tenant Voice/Data Services Processor 201 via the RAN Adaptation layer, which includes RAN Adapters 102-105. Multi-Tenant Voice/Data Services Processor 201 stores and retrieves data in Multi-Tenant Call State Database 122.

Audio Services Processor 202 performs audio functions necessary to support Multi-Tenant Voice/Data Services Processor 201. Audio Services Processor 202, for example, performs the functions of vocoding, devocoding, transcoding, encryption, and decryption. Audio Services Processor 202 may also perform audio routing services, for example, duplication of audio packets and routing to target RAN endpoints, such as RF Sites.

Resource Management Processor 203 provides integrated resource management for multiple systems and multiple technologies. In an exemplary embodiment, Resource Management Processor 203 provides overall call resource management based on a call state determined by each technology. In addition, Resource Management Processor 203 preferably determines the overall call state, such as grant, busy, or reject.

In the exemplary embodiment depicted herein, Resource Management Processor 203 interacts with the resource management processors within the RANs connected to call processing system 101. For example, Resource Management Processor 203 obtains channel/slot resources for each Astro RAN, such as RAN 112 and RAN 113 in FIG. 1. Each RAN preferably includes multiple sites and consoles, and preferably uses ASTRO resource allocation rules. Resource Management Processor 203 preferably obtains slot resources for MOTOTRBO RAN 114 that includes a talkgroup member, preferably using MOTOTRBO resource allocation rules. Similarly, Resource Management Processor 203 preferably uses an Rx interface to obtain bearers per radio for critical users when interfacing with LTE RAN 115, preferably using LTE resource management rules. In accordance with an exemplary embodiment, Resource Management Processor 203 obtains resources from the associated RA, in this example LMR RA 102 and LMR RA 103.

Access Control Processor 204 isolates data needed for a service to only those needing access. By protecting shared data, privacy is enhanced. Access Control Processor 204 preferably controls access of a calling party and a called party based upon whether the calling party and the called party are allowed to perform a service requested and also whether the calling party and the called party are allowed to perform the requested service at the sites where the service was requested. Access Control Processor 204 also controls access for group calls, such as talkgroup calls, preferably by accessing subscriber access control (SAC) database and retrieving SAC records for each mobile device participating in the call. For talkgroup calls, this includes verifying access to the requested service and whether the requested service is allowed at the site.

Figure 3:
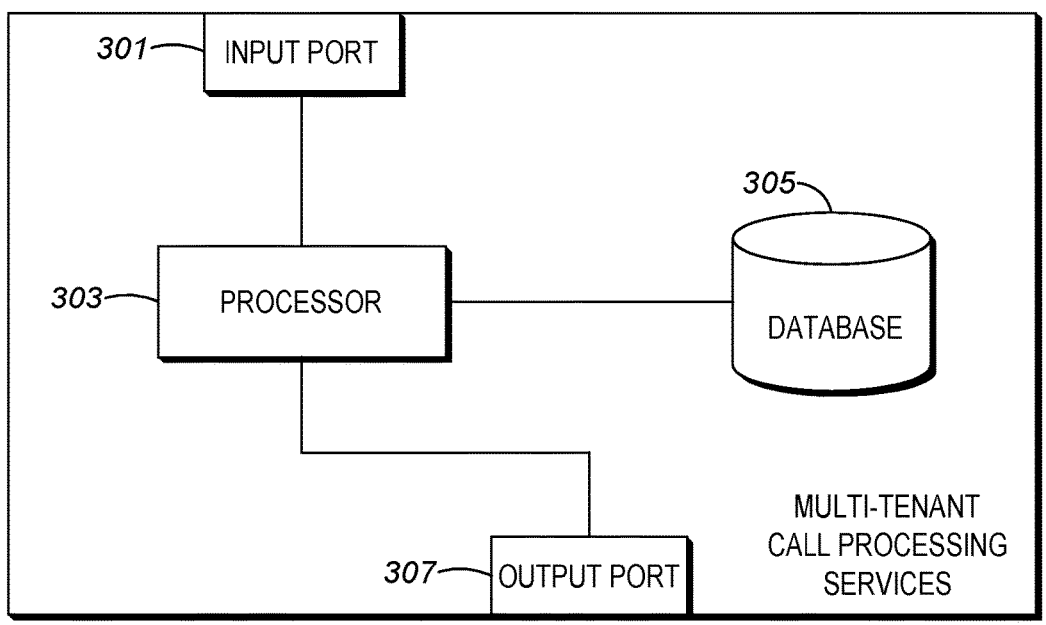
FIG. 3 depicts a schematic diagram of a multi-tenant call processing services function in accordance with an exemplary embodiment of the present invention.

FIG. 3 depicts a schematic diagram of LMR System RAN Adapter 102 in accordance with an exemplary embodiment of the present invention. In the exemplary embodiment depicted in FIG. 3, LMR System RAN Adapter 102 includes an input port 301, a processor 303, a database 305, and an output port 307. Input port 301 and processor 303 communicate over one or more communication lines or buses, as do processor 303 and output port 307. Wireless connections or a combination of wired and wireless connections are also possible.

Input port 301 receives electronic signals and messages from LMR System RAN 112, Multi-Tenant Call Processing Services 121, and Multi-Tenant Mobility Services 131. Output port 307 transmits signals and messages to LMR System RAN 112, Multi-Tenant Call Processing Services 121, and Multi-Tenant Mobility Services 131. As described above, each of these RAN Adapters transmits and receives signals and messages from associated RANs. Input port 301 and output port 307 are electrically connected to processor 303. Although depicted in FIG. 3 as two separate elements, input port 301 and output port 307 can be a single element.

Processor 303 may include a microprocessor, application-specific integrated circuit (ASIC), field-programmable gate array, or another suitable electronic device. Processor 303 obtains and provides information (for example, from database 305 and/or input port 301), and processes the information by executing one or more software instructions or modules, capable of being stored, for example, in a random access memory ("RAM") area of database 305 or a read only memory ("ROM") of database 305 or another non-transitory computer readable medium, such as Multi-Tenant Call State Database 122. The software can include firmware, one or more applications, program data, filters, rules, one or more program modules, and other executable instructions. Processor 303 is configured to retrieve from database 305 and execute, among other things, software related to the control processes and methods described herein.

Database 305 can include one or more non-transitory computer-readable media, and may include a program storage area and a data storage area. The program storage area and the data storage area can include combinations of different types of memory, as described herein. In the embodiment illustrated, database 305 stores, among other things, instructions for processor 303 to carry out the method of FIG. 4.

Figure 4:
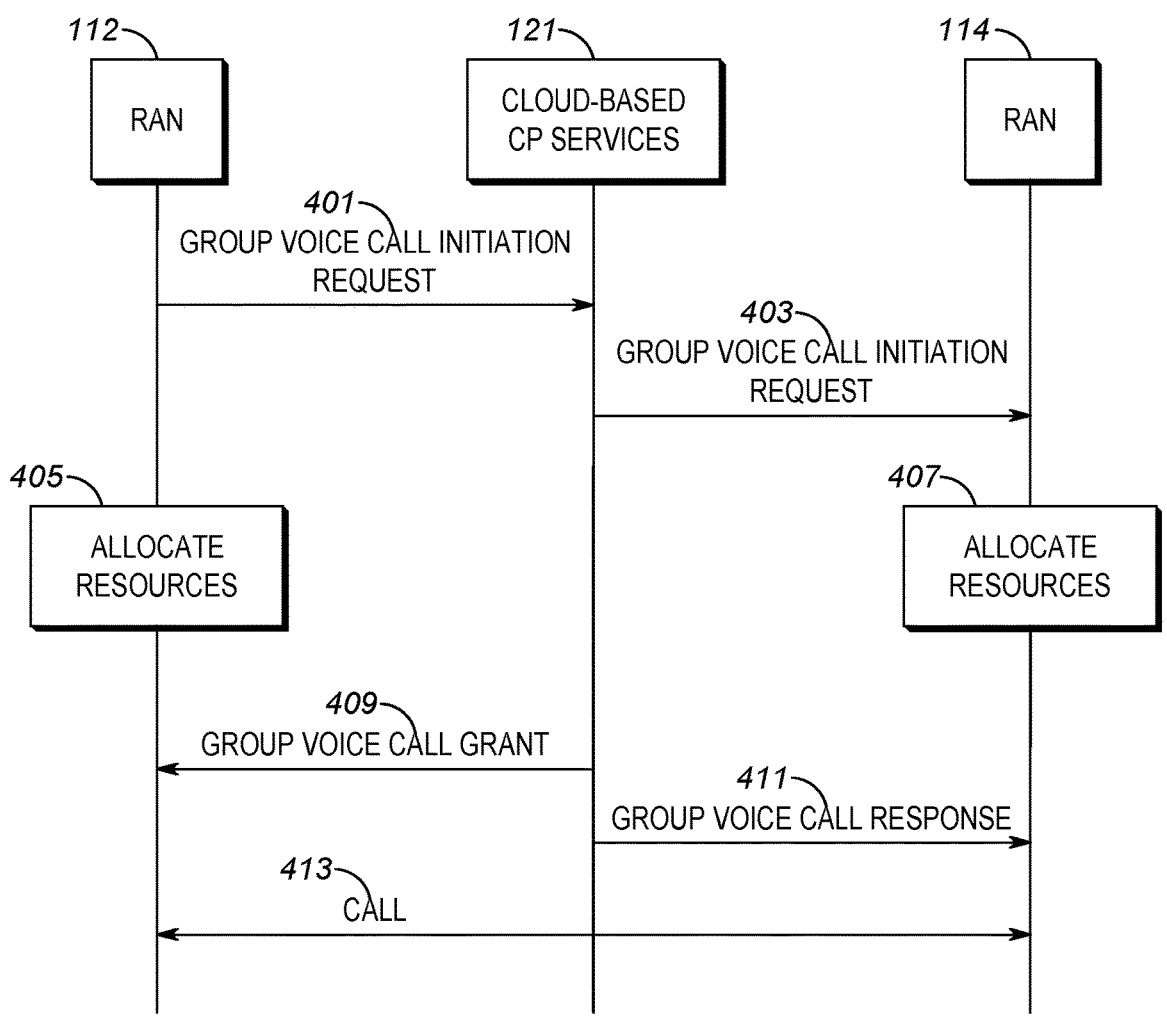
FIG. 4 depicts a call flow diagram in accordance with an exemplary embodiment of the present invention.

FIG. 4 depicts a call flow diagram 400 of a method for completing a voice call in a cloud-based communication system in accordance with an exemplary embodiment of the present invention. In accordance with the exemplary embodiment depicted in FIG. 4, First Communication System 112 and Second Communication System 114 are distinct from each other, although this process is effective when a mobile device initiates a group call to another mobile device on the same communication system. It should also be understood that this invention works for two communication systems that are utilizing the same over the air (OTA) protocol, such as LMR ASTRO, LMR MotoTRBO, or LTE, or whether the two OTA protocols are different. This is facilitated at least in part because the call processing functionality is being performed at Cloud-Based Call Processing Services 121, which is capable of processing calls for multiple technologies, from multiple systems, and for multiple tenants.

In accordance with an exemplary embodiment, a first mobile device located at First Communication System 112 sends a call initiation request to First Communication System 112. In response, RAN 112 sends Group Voice Call Initiation Request 401 to Cloud-Based Call Processing Services 121. In accordance with an exemplary embodiment, Group Voice Call Initiation Request 401 comprises request to complete a group voice call with a second mobile device located at Second Communication System 114. The group voice call can be, for example, a talkgroup call.

In accordance with an exemplary embodiment, First Mobile Device 122 sends a call request message to LMR System 1 RAN 112. The call request message is preferably received at a base station within LMR System 1 RAN 112.

RAN 112 sends a call request message to LMR System RA 102. The call request message comprises a request to complete a call with Second Mobile Device 124, preferably via a group call.

LMR System RA 102 determines RAN-specific access parameters for First Mobile Device 122 and Second Mobile Device 124. In the exemplary embodiment where the call is a talkgroup call, parameters relating to the talkgroup are also determined. Examples of parameters include fully qualified identification information as well as access permissions specific to that RAN, such as RF Sites allowed for the call and RF channel attributes. RF channel attributes include the number of TDMA slots per channel or specific capabilities associated with the channel, such as encryption capabilities.

LMR System RA 102 sends Call Initiation Request message 401 to Cloud-Based Call Processing Service 121. Call Initiation Request message 401 preferably includes the RAN-specific access parameters and call initiation information for First Mobile Device 122 and Second Mobile Device 124. In the exemplary embodiment where the call is a talkgroup call, talkgroup parameters are included in Call Initiation Request message 401. Cloud-Based Group Call Service 121 sends an obtain mobility info message to Cloud-Based Mobility Service 131. The obtain mobility info message preferably includes the fully qualified requesting mobile device identification and the fully qualified talkgroup identifier used for the group call service Cloud-Based Mobility Service 131 retrieves mobility information for mobile device 122 and mobile device 124. In the exemplary embodiment where the call is a talkgroup call, Cloud-Based Mobility Service 131 retrieves mobility information for the RF Sites that must be allocated for the group call service to reach all members of the group.

Cloud-Based Mobility Service 131 sends mobility information to Cloud-Based Call Processing Service 121. The Mobility Information message preferably includes the information that was obtained previously.

Cloud-Based Call Processing Service 121 sends Group Voice Call Initiation Request message 403 to RAN 114, preferably traversing LMR System RA 104. Group Voice Call Initiation Request message 403 preferably includes a list of the resources at LMR System 3 RAN 114 that are necessary to complete the call.

RAN 112 allocates (405) resources necessary for the call. The resources include any resources controlled by RAN 112 that are required to make the call. RAN 112 and RA 102 then determine the resources necessary for the call. These resources can include, for example, the list of RF Sites that need resources allocated. The RA then examines the list of available resources, for example RF Channels, and selects the most appropriate resource for the group call. This resource is then reserved and allocated for the specific call.

RAN 114 allocates (407) resources to facilitate the voice call. The resources include any resources controlled by RAN 112 that are required to make the call. RAN 114 and RA 104 then determine the resources necessary for the call. These resources can include, for example, the list of RF Sites that need resources allocated. The RA then examines the list of available resources, for example RF Channels, and selects the most appropriate resource for the group call. This resource is then reserved and allocated for the specific call. It should be understood that the order of processes 405 and 407 is not significant. For example, the present invention is functional whether process 405 occurs first, or process 407 occurs first, or whether processes 405 and 407 occur simultaneously.

Cloud-Based Call Processing Service 121 sends Group Voice Call Grant message 409 to RAN 112. RAN 112 ensures that all necessary resources, including Mobile Device 122, are aware of the call grant.

Cloud-Based Call Processing Services 121 issues Group Voice Call Response message 411 to RAN 114, which passes on the call grant to the receiving mobile device 124 located at RAN 114. In accordance with an exemplary embodiment, the group voice call setup is now complete and the group voice call can commence.

Call 413 commences between First Mobile Device 122 and Second Mobile Device 124.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for completing a voice call in a cloud-based communication system, the method comprising:

receiving, at a cloud-based voice call service, a group voice call initiation request from a first mobile device located at a Land Mobile Radio communication system, the group voice call initiation request comprising a request to complete a talkgroup call with a second mobile device located at a Long Term Evolution communication system;

retrieving mobility information for the first and the second mobile devices for RF sites that must be allocated for the talkgroup call, wherein the mobility information comprises a registration state for the first and the second mobile devices, a talkgroup affiliation for the first and the second mobile devices, a site location for the first and the second mobile devices, a console registration state for the first and the second mobile devices;

sending a Group Voice Call Initiation Request message to a radio access network (RAN) adaptor for the Land Mobile Radio communication system, the Group Voice Call Initiation Request including a list of the resources at Land Mobile Radio System that are necessary to complete the talkgroup call;

allocating resources at the Land Mobile Radio communication system and the Long Term Evolution communication system;

issuing, by the cloud-based voice call service, a call grant to the first mobile device located at the Land Mobile Radio communication system; and issuing, by the cloud-based voice call service, a call response to the second mobile device located at the Long Term Evolution communication system in order to complete the voice call.

2. The method of claim 1, the method further comprising the step of performing call processing functionality at the cloud-based voice call service.

3. A cloud-based group voice call service for completing a voice call in a cloud-based communication system, the cloud-based group voice call service comprising:

an input port for receiving a group voice call initiation request from a Land Mobile Radio communication system for a first mobile device located at a Land Mobile Radio communication system, the group voice call initiation request comprising a request to complete a talkgroup call with a second mobile device located at a Long Term Evolution communication system, the input port also receiving mobility information for the first and the second mobile devices for RF sites that must be allocated for the talkgroup call, wherein the mobility information comprises a registration state for the first and the second mobile devices, a talkgroup affiliation for the first and the second mobile devices, a site location for the first and the second mobile devices, a console registration state for the first and the second mobile devices;

a processor that performs allocating resources for the Land Mobile Radio communication system and the Long Term Evolution communication system; and an output port that performs:

sending a Group Voice Call Initiation Request message to a radio access network (RAN) adaptor for the Land Mobile Radio communication system, the Group Voice Call Initiation Request including a list of the resources at Land Mobile Radio System that are necessary to complete the talkgroup call issuing a call grant to the Land Mobile Radio communication system for the first mobile device; and issuing a call response to the Long Term Evolution communication system for the second mobile device in order to complete the voice call.

4. The cloud-based group voice call service of claim 3, wherein the processor further performs performing call processing functionality.

\* \* \* \* \*